United States Patent [19]

DeGooyer

[11] Patent Number: 4,525,542

[45] Date of Patent: Jun. 25, 1985

[54] NOVOLAC BASED EPOXY RESIN CURING AGENTS FOR USE IN SOLVENT

[75] Inventor: William J. DeGooyer, Louisville, Ky.

[73] Assignee: Celanese Corporation, New York, N.Y.

[21] Appl. No.: 652,582

[22] Filed: Sep. 20, 1984

[51] Int. Cl.³ .............................................. C08L 63/04
[52] U.S. Cl. .................................. 525/484; 525/481; 525/504; 525/510; 428/413; 428/416
[58] Field of Search ................. 525/504, 484, 510, 481

[56] References Cited

U.S. PATENT DOCUMENTS

| | | | |
|---|---|---|---|
| 3,474,073 | 10/1969 | Higashi | 525/484 X |
| 3,686,101 | 8/1972 | Davis et al. | 525/504 X |
| 4,021,410 | 5/1977 | Koyama | 525/504 X |
| 4,093,594 | 6/1978 | Anderson | 525/523 |
| 4,116,900 | 9/1978 | Belanger | 525/510 X |
| 4,189,539 | 2/1980 | Ward | 525/504 X |
| 4,246,148 | 1/1981 | Shimp et al. | 525/481 X |
| 4,348,505 | 9/1982 | Di Benedetto et al. | 525/504 |

FOREIGN PATENT DOCUMENTS 1071331  12/1959  Fed. Rep. of Germany ...... 525/504

*Primary Examiner*—Howard E. Schain
*Attorney, Agent, or Firm*—Donald L. Cox

[57] ABSTRACT

The instant invention is an epoxy resin curing agent based upon an epoxy novolac containing, on the average, between about 3 and about 7.5 epoxy groups per molecule, in which substantially all of the epoxide groups are reacted with a polyamine wherein each primary amine hydrogen in the resulting reaction product is further reacted with a monoepoxide. The resulting epoxy resin curing agent may be used in a solvent based system to cure epoxy resins under low temperature curing conditions.

16 Claims, No Drawings

NOVOLAC BASED EPOXY RESIN CURING AGENTS FOR USE IN SOLVENT

BACKGROUND OF INVENTION

1. Field of Invention

This invention relates to epoxide resin curing agents. More particularly, this invention to novolac based polyamines which may be used to cure polyepoxides in solvent based systems.

2. Prior Art

Ambient temperature curable epoxide resin systems have been known for many years. Predominate are the amine based systems such as the polyamido amines and the curing agents based upon polyalkylenepolyamines. However, many prior art relatively low temperature curing systems have been extremely slow to cure at these reduced temperatures—particularly temperatures which are witnessed during the winter months in the east and in northern latitudes. Thus the search has continued to discover epoxide resin curing agents which are operable at low temperatures but which, under these conditions, produce cured epoxide resin coatings which exhibit optimum cured state properties.

U.S. Pat. No. 4,116,900 discloses cathodic electro deposition resin systems prepared based upon polyepoxides, polyamines and monoepoxides. While the monoepoxide and polyamine are similar to the products used in this invention, the polyepoxide utilized in the '900 patent is quite different. Specifically in column 3, lines 47 to 68 there is no disclosure of the use of novolac type, highly branched, highly functional epoxy resins.

Likewise, U.S. Pat. No. 4,246,148 discloses an aqueous coating composition based upon a epoxy polyamine adduct end capped with monoepoxide. Again in the '148 patent it is made clear that highly functional, highly branched epoxy such as the novolac resin were not contemplated. Specifically in column 5 lines 10 to 20, a general formula is shown which clearly discloses a diepoxide, not a tri- or tetra-functional epoxide as contemplated by the applicant.

Thus it is the object of this invention to prepare curing agents which are useful at temperatures of less than about 30° F.

Another object of this invention is to prepare epoxide resin curing agents which are useful in solvent based systems.

It is another object of this invention to prepare epoxide curing resin agents which provide optimum cured state properties for epoxy resins cured under ambient or less than ambient condition.

These and other objectives are obtained by preparing the epoxide resin curing agents of the instant invention.

SUMMARY OF INVENTION

Basically the instant invention involves a room temperature or less-than-room-temperature curable coating system. This system is utilized to cure epoxide resins and involves a reaction product which contains about one mole of a novolac based polyepoxide having, on the average, at least 3 and no less than about 7.5, epoxide groups per molecule, in which substantially all epoxide groups have been reacted with a polyamine and wherein each primary amine group of said polyamines has further been reacted with a monoepoxide. These curing agents, which may be employed in solvent systems, may be utilized in low temperature curable epoxide resin coating systems to provide superior cured state film properties and to permit low temperature curing of conventional epoxide resins.

DETAILED DESCRIPTION OF INVENTION

The first component of the instant invention is an epoxy novolac resin. In order to insure that the curing agents prepared according to the instant invention have the desired degree of branching, it is essential that the epoxy novolac resins utilized as the starting material have an average epoxy functionality of at least about 3 to about 7.5, preferably about 3 to about 4. In other words, the compositions of the instant invention should be prepared based upon a novolac containing from about 3 to 7.5 phenolic hydroxyl groups.

The novolac starting material is defined as the reaction product of a mono or dialdehyde most usually formaldehyde with a mono or polyphenolic material. Examples of the monophenolic materials which may be utilized to prepare the base novolacs useful in the instant invention include unsubstituted phenol and the various substituted phenols such as the cresols, alkyl and aryl substituted phenols such as p-tert-butylphenol, phenylphenol and the like. Polyphenolic materials such as the various diphenols including bisphenol-A and the like may also be utilized.

The aldehydes which are utilized to form the novolac materials of the instant invention are predominately formaldehyde (usually paraformaldehyde is the starting material). However, glyoxal may also be utilized, as may the higher alkyl aldehydes up to about the $C_4$ aldehydes. When glyoxal is employed it may be used to form a tetrafunctional novolac by reacting four moles of phenol with one mole of glyoxal.

In the typical reaction scheme, paraformaldehyde is reacted with phenol under acidic conditions to prepare a polyphenolic material or novolac. This material is then reacted with epichlorohydrin and dehydrohalogenated under basic conditions to produce the epoxy novolac resin. The procedures utilized to form epoxy novolacs from novolac starting materials are well known in the art and will not be repeated here.

As stated previously, the epoxy novolac resin useful herein, must have, on the average, at least about 3 epoxide groups and no greater than about 7.5 epoxide groups per molecule. When less than about 3 epoxide groups are present, the desired degree of crosslink density and branching in the cured product is not obtained. As a result curing agents prepared from these materials do not have the desired degree of toughness. On the other hand, when more highly functional materials, i.e. greater than about 7.5 epoxide groups per molecule are prepared, it is extremely difficult to process these materials and they often gel prior to the formation of the end product. In addition, the pot life of blends of these highly functional curing agents with epoxide resins is extremely short—in most cases too short for actual practical use.

Each site in the epoxy novolac which contains an epoxide group is reacted with a polyamine. The polyamines contain at least two amine nitrogen atoms per molecule, at least three amine hydrogen atoms per moleculer, and no other groups which are reactive with epoxide groups. These polyamines can be aliphatic or cycloaliphatic and contain at least two carbon atoms per molecule. Useful polyamines contain about 2 to about 6 amine nitrogen atoms per molecule, 3 to about 8 amine hydrogen atoms, and 2 to about 20 carbon atoms. Examples of such amines are the polyalkylenepolyamines, ethylene diamine, 1,2-propylene diamine, 1,3-propylene diamine, 1,2-butylene diamine, 1,3-butylene diamine, 1,4-butylene diamine, 1,5-pentylene diamine, 1,6-hexylene diamine, methane diamine, 1,4-diaminocyclohexane, meta-xylylene diamine and the like. Preferred amines for use in this invention are polyamines of the formula:

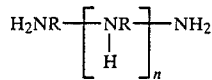

wherein n is of 0 to 4 and R is an an alkylene group containing 2 to 8 carbon atoms. Examples of such alkylene polyamines are ethylene diamine, diethylene triamine, triethylene tetramine, tetraethylene pentamine, pentaethylene hexamine, dipropylene triamine, tributylene tetramine, hexamethylene diamine, dihexamethylene triamine and the like. Mixtures of amines can also be used. The more preferred amines are the ethylene polyamines with the most preferred being triethylene tetramine and diethylene triamine.

The final component of the instant invention is an end capping agent. The end capping agent should be employed in an amount sufficient to react with substantially all primary amine groups (thereby providing extended pot life) and yield an end capped adduct which is compatible with the epoxy resin which is employed.

It has been found that end capping agents which meet these requirements include a monoepoxide or mixture of monoepoxides having (a) one 1,2-epoxide group per molecule and no other groups which are reactive with amine groups and (b) between about 9 and about 20, preferably between about 10 and 15, carbon atoms per molecule.

Representative examples of suitable aliphatic monoepoxides for use in the end capping agent include monoepoxidized terminally unsaturated straight chain hydrocarbons (also known as terminal olefin oxides) having between about 9 and about 16, preferably between about 11 and about 14, carbon atoms and mixtures thereof, such as decylene oxide, undecylene oxide, dodecylene oxide, tridecylene oxide, tetradecylene oxide, and pentadecylene oxide, monoglycidyl ethers of aliphatic alcohols, said glycidyl ethers having between 6 to 20 carbon atoms, and mixtures thereof, such as octyl glycidyl ether, nonyl glycidyl ether, decyl glycidyl ether, and dodecyl glycidyl ether; and monoglycidyl esters of saturated tertiary monocarboxylic acids, said esters having between about 9 and about 16, preferably between about 11 and 14 carbon atoms, such as the glycidyl ester of versatic acid (i.e., a mixture of 9 to 11 carbon carboxylic acids used to make Cardura E), tert-octanoic acid, tert-nonanoic acid, tert-decanoic acid, tert-undecanoic acid, and tert-dodecanoic acid.

Representative examples of aromatic monoepoxides, i.e., at least one aromatic ring containing compound having attached thereto an epoxy functional group and no other reactive functional groups, include the monoglycidyl ethers of monohydric aromatic alcohols such as phenol and naphthanol, alkyl substituted monoglycidyl ethers of monohydric aromatic alcohols, said alkyl groups having from about 1 to about 4, or higher carbon atoms, such as monoglycidyl ether of p-tert-butyl phenol and o-cresol. The preferred aromatic monoepoxide is o-cresyl glycidyl ether.

Finally, oils containing up to about 24 carbon atoms per molecule and containing an unreacted epoxide group may also be used herein. Examples of such materials include cashew nut oil monoglycidyl ether.

In preparing the epoxy-amine adducts of this invention, the polyepoxide resin and the polyamine are reacted under such conditions that the adduct so formed contains about 1 mole of polyamine for each epoxide group originally present in the polyepoxide resin, i.e., about one mole of polyamine is reacted with each epoxide equivalent of the polyepoxide.

The reaction between the epoxy novolac, the polyamine and the monoepoxide is not difficult to carry out. Preferably the epoxy novolac is reacted with a relatively large excess of the polyamine at temperature of approximately 200° to 300° F. In general it is preferred that the epoxy novolac be added to the amine over a period of time—generally about one to four hours. The amount of excess which is employed varies depending upon the reactivity of the various reactants which are chosen. At least about 2.25 and preferably at least about 3 moles and no more than about 10 moles of amine are employed for each epoxide equivalent present in the epoxy novolac. After all of the novolac has been added, the materials are allowed to react at reaction temperature for approximately one to four hours.

The preparation of adducts of polyepoxide resins and polyamines is described in further detail in U.S. Pat. Nos. 4,093,594 and 4,116,900, the disclosures of which are hereby incorporated by reference.

When the adducting reaction is completed, unreacted amine, if any, is removed by vacuum distillation or by steam sparging under vacuum distillation, at temperatures of not greater than about 500° F. If temperatures in excess of 500° F. are employed, the adduct will discolor. The steam sparging is conducted in a manner sufficient to reduce the presence of unreacted amine in the adduct to an amount not greater than about 0.5% by weight, based on the weight of the adduct. If unreacted amine is present in amounts greater than about 0.5%, the pot life of the mixture of the curing agent and the polyepoxide which forms upon mixing the two components described herein will be reduced substantially.

Many epoxy novolac resins are supplied by the manufacturer dissolved in a ketone which will interfere with the reaction between the novolac and the amine. In such situations it is necessary to remove the ketone prior to reaction between the novolac and the amine. This is carried out by heating the epoxy novolac under vacuum and replacing the ketone with a hydrocarbon solvent such as toluene or xylene.

Because at this point in the reaction scheme, after the epoxide resin has reacted with the polyamine, the product may be extremely heavy, it is preferred that an oxygenated solvent such as butanol be added to the reaction mixture to reduce its viscosity. In general 20 to about 50 percent by weight of butanol or another oxygenated solvent may be added at this point to control processing viscosity.

When the epoxy-amine adduct formation has been completed and the unreacted amine has been removed, the end capping agent is reacted therewith at a temperature of about 65° C. to about 150° C. for a time sufficient to bring the reaction to completion, typically about 5 minutes to 3 hours. Lower temperatures may be employed at the expense of increasing the reaction time.

The maximum amount of the end capper which can be reacted with the epoxy-amine adduct is influenced by whether a monoepoxide is employed as a diluent for the epoxy resin as described hereinafter. It has been found that if too many of the reactive amine groups of the epoxy-amine adduct are defunctionalized before or during reaction with the epoxy resin, either by reaction with the monoepoxide end capping agent or by eventual reaction with the diluent which can accompany the epoxy resin, then epoxy resin will not react to the desired extent with the end capped adduct and the cured film will be soft and exhibit poor solvent resistance.

The minimum amount of end capping agent which is reacted with the epoxy-amine adduct is controlled by the improvement in wettability sought to be imparted to the coating composition and the adverse effect on pot life which the presence of primary amines would impart to the coating composition.

The presence of a significant amount of primary amine groups on the end capped epoxy-amine adduct reduces the pot life of the system to an unacceptable extent due to their high reactivity and will result in either a rapid viscosity drop or increase depending on the molecular weight of the polyepoxide employed to prepare the epoxy-amine adduct. In addition, primary amine groups in the finished product tend to form amine carbonates producing undesirable amine "sweating". Thus, the amount of end capping agent must at least be sufficient to substantially eliminate the presence of primary amines on the epoxy amine adduct. Generally the maximum amount of the end capping agent should be no more than about 1.2 moles per primary amine group.

After the reaction is completed, the material is reduced in a solvent or co-solvent for the system. In general, the amount of the solvents that is added is not greater than about 50% and is typically about 5 to about 50% by weight based on the weight of the adduct and co-solvent, preferably no greater than about 40%. Examples of the solvent include ethers, alcohols, esters, glycol ethers, ketones, aromatic and aliphatic hydrocarbons and the like. The preferred solvents are the lower alkyl alcohol such as ethanol, propanol and butanol.

The second component of the coating system useful herein is a low molecular weight epoxy resin having more than one terminal epoxide group. The epoxy resins suitable for use in the second component include the glycidyl polyethers of dihydric phenols as well as epoxy novolac resins. The dihydric phenols employed to prepare the epoxy resins are further described in U.S. Pat. No. 4,246,148. It is particularly preferred to employ those glycidyl polyethers wherein the dihydric phenol is bisphenol-A.

The maximum molecular weight of the epoxy resin is limited by the fact that the amount of epoxy resin employed in the second component is usually selected to achieve stoichiometric equivalence of epoxy groups with the amine hydrogen equivalents of the end capped epoxy-amine adduct. Consequently, as the molecular weight of the epoxy resin increases, thereby increasing the epoxide equivalent weight, more of the epoxy resin is required to satisfy the stoichimeteric requirement.

In view of the above, it is preferred to characterize the epoxy resin also in terms of its epoxide equivalent weight. Thus the epoxide equivalent weight (WPE) of the glycidyl polyethers of dihydric phenols is not greater than about 600, preferably from about 180 to 200.

As described above, the amount of epoxy resin which is present in the coating composition is preferably sufficient to achieve substantially stoichiometric equivalence with the reactive amino hydrogens on the end capped epoxy-amine adduct. In general, it is preferred to employ the epoxy resin in an amount sufficient to achieve an epoxy to reactive adduct amine hydrogen equivalent weight ratio of from about 0.5:1.0 to about 1.5:1.0, and, preferably, from about 0.9:1.0 to about 1.1:1.0.

When components I and II are mixed, the resulting coating composition exhibits a pot life at room temperature of from about 2–5 hours.

The pot life of the coating composition is herein defined to be the elapsed time from mixing the components together until the resulting composition is no longer suitable, with normal thinning, for application by spray, brush, or roll coating techniques to a substrate. The suitability for application by common techniques can be expressed in terms of the viscosity of the coating composition. Thus, the pot life of unpigmented coatings can be characterized as the elapsed time from mixing the two components to the time when the viscosity of the coating compositions drops below $A_1$ or increases above Z as determined by the Gardner-Holdt method. For pigmented coatings, useful applications viscosities are between 50 and 140 Kreb Units (K.U.) as determined with a Stormer viscometer.

Coatings based on the compositions described herein can be formulated into easily handled two-package systems which blend together as easily as their solvent based counterparts. Applications properties are excellent. Application by brush, spray and roller-coating are remarkably free of bubbling and other film imperfections.

The coating systems described herein also exhibit good adhesion to such widely varied substrates as galvanized metal, cold rolled steel (untreated and phosphate treated), hot rolled steel, and aluminum. Flash rusting is not a problem over untreated steel and, therefore, there is no need for special additives as in some water reducible epoxy systems. Adhesion is also excellent to three and four-year old alkyd and epoxy ester enamel films. Such systems may therefore be employed for repaint purposes in food processing plants and dairies and can also be used as adhesive compositions per se.

As pointed out above a major advantage of the coating compositions of the instant invention is that they are useful at relatively low temperatures, i.e. temperatures of less than about 50° F. and may even be used at temperatures as low as 20° F. This low temperature curing ability of the compositions of the instant invention makes them particularly useful for coatings which are applied during the winter in outdoor settings.

The invention is additionally illustrated in connection with the following Examples which are to be considered as illustrative of the present invention. It should be understood, however, that the invention is not limited to the specific details of the Examples. All parts and percentages in the claims as well as in the remainder of the specification are by weight unless otherwise specified.

EXAMPLE 1

Into a reactor equipped with a mechanical agitator, thermometer, sampling device, and nitrogen sparge were added 1497 parts of triethylene tetramine. The mixture was heated to 205° F. and 900 parts of an epoxy novolac resin 1/ having a weight per epoxide (WPE) of 184.8 and an average epoxy functionality of 3.6 dissolved to 70.2% solids in toluene were added to the reactor over a 1 hour period. After all of the novolac resin was added to the reactor, the material was gradually heated over about a 1 ¼ hour period to 300° F. at which time a vacuum of 11 Torr. was applied. The vessel was held at temperatures ranging from 325° F. to 450° F. for approximately 1 hour. At this point the vacuum was turned off and 585 parts of butanol were added to the mixture. With the mixture at approximately 220° F., 623 parts of cresyl glycidyl ether (WPE of 182.2) were added over 0.5 hr. The mixture was held at approximately 230° F. for 0.5 hr. and the mixture was reduced in 585 grams of butanol. The resulting product exhibited a Gardner Holdt 25° C. viscosity of Z to $Z_2$ and a solids content of 60.2%.

1/ The resin is based upon DEN 438 available from the Down Chemical Corporation dissolved in acetone. In order to be useful in this invention it is necessary to strip off the acetone and dissolve the resulting epoxy novolac polymer in toluene.

EXAMPLE 2

Utilizing essentially the same procedure as described in Example 1, a reactor was charged with 972 parts of meta-xylylene diamine. Added to this mixture over approximately 1 hour were 600 parts of the epoxy resin as described in Example 1. Following addition of the epoxide, the material was held at approximately 200° F. for 2 hours at which time the mixture was placed under vacuum at 6 Torr. and heated over approximately 1 hour to 450° F. at which time all excess meta-xylylene diamine had been distilled from the flask. Maintaining the temperature at approximately 185° F., 400 parts of cresyl glycidyl ether was added to the reaction mixture and the mixture was held at approximately 200° F. for ½ hour. At this point, 384 butanol were added to the reactor producing a solution having a Gardner Holdt 25° C. viscosity of $Z_3$–$Z_4$, solids content of 59.3%.

EXAMPLE 3

Into a reactor equipped as specified in Example 1 were added 990 parts of triethylene tetramine. The mixture was heated to 200° F. and 600 parts of Epo Tohto 638, an epoxy novolac resin essentially equivalent to the epoxy novolac described in Example 1 and available from the Tohto Kasei Co. having a percent non-volatile of 70.3% in toluene and a weight per epoxide of 186, were added over approximately a 1 hour period. The mixture was held for approximately 1 hour at 200° F. and a vacuum was applied. After holding under a 5 Torr vacuum at a temperature of between 300° and 450° F. for approximately 1 hour, the heat was turned off and 387 parts of 1-butanol were added to the mixture. With the temperature at approximately 225° F., 411 parts of cresyl monoglycidyl ether were added to the mixture over approximately 35 minutes. The mixture was held at approximately 225° F. for ½ hour and 387 parts of 1-butanol were then added to the mixture. The resulting product exhibited a Gardner Holdt 25° C. viscosity of $Z_1$, and a solids content of 60.6.

EXAMPLE 4

Into a reactor equipped as in Example 1 were added 1042 parts of triethylene tetramine. The mixture was blanketed with nitrogen and heated to 200° F. 600 parts of the epoxy novolac described in Example 1 having a weight per epoxide of 180 and a solids content of 71.4% in toluene were added to the mixture over approximately a 1 hour period while maintaining the temperature at 200° F. The solution was then held at this temperature for approximately 2 at which time a vacuum was applied and the mixture was heated over 50 minutes to 455° F. 475 parts of 1-butanol were added to the mixture after cooling to 350° F. and releasing the vacuum and with the temperature at approximately 215° F., 309 parts of cresyl glycidyl ether and 340 parts of epoxidized cashew nut oil (Cardolite NC 513, availabe from the 3-M Corporation having a weight per epoxide of 500) were added to the mixture. The mixture was held at 200° F. for approximately 35 minutes and 435 parts of butanol were added. The resulting product exhibited a Gardner Holdt 25° C. viscosity of X, and a solids content of 59.2%.

EXAMPLE 5

A curable blend was prepared by mixing 100 parts of the material prepared in Example 1 with 21 parts of xylene and 75 parts of Epi Rez 510, a low molecular weight diglycidyl ether bisphenol-A having a weight per epoxide of about 185 available from the Celanese Specialty Resins Company. The blend was applied to a thickness of 2 mils over a Bonderite 1000 cold rolled steel panel. The material was allowed to cure at 30° F. for 1 week and was then evaluated. A second panel was evaluated after curing for 1 week at 70° F.

EXAMPLE 6

A second blend of a standard, commerically available, low temperature curing system was prepared by mixing 100 parts of Epi Rez 510, 79.9 parts of xylene and 66.7 parts of NC 541, polyamine base curing agent available from the 3M Company. Bonderite 1000 panels were coated and evaluated as in Example 6.

TABLE

| | 70° F. Cures | | | | |
|---|---|---|---|---|---|
| Example | Pencil Hardness (one week) | MEK Rubs | $HNO_3$ | NAOH | $H_2O$ |
| 5. | 4H | 100/4H | 4H | 4H | 4H |
| 6. | H | 100/H | 8D/4B (blisters) | H | H |

| | 30° F. Cures | | | | |
|---|---|---|---|---|---|
| Example | Pencil Hardness | MEK | $HNO_3$ | NAOH | $H_2O$ |
| 5. | H | 100/<6B | B | H | H |
| 6. | 6B | 10 (hazy) | 6B (hazy) | 6B (hazy) | 3B |

As can be seen from the above table, the low temperature curing system of the instant invention produces far superior properties when compared to the industry standard type of coating composition. In each instance, both under ambient and under low temperature curing conditions and with and without chemical treatment, the compositions of the instant invention showed improved cure properties as measured by pencil hardness when compared to the standard prior art material.

I claim:

1. A novolac based epoxy resin curing agent comprising the reaction product of an epoxy novolac compound, a primary amine containing polyamine and a monoepoxide, wherein substantially all of the epoxy groups are reacted with the polyamines and wherein at least substantially all of the unreacted primary amine groups in the polyamine/epoxide reaction product groups are further reacted with the monoepoxide.

2. The curing agent of claim 1 wherein, the epoxy novolac is prepared by epoxidizing the reaction product of a phenol and an aldehyde to produce an epoxy containing product having, on the average, about 3 to 7.5 epoxide groups per molecule.

3. The curing agent of claim 2 wherein the novolac is a phenol/formaldehyde based novolac.

4. The curing agent of this claim 2 wherein the phenol is at least in part bisphenol-A.

5. This curing agent of claim 1 wherein the novolac is based at least in part on glyoxal.

6. The curing agent of claim 1 wherein the polyamine is a polyalkylenepolyamine.

7. The curing agent of claim 1 wherein the polyamine has the formula:

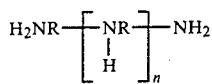

wherein n is 0 to 4 and R is an alkylene group containing 2 to 8 carbon atoms.

8. The curing agent of claims 6 or 7 wherein the amine is selected from diethylenetriamine, triethylenetetramine, tetraethylenepentamine and meta-xylyene diamine.

9. The curing agent of claim 1 wherein the monoepoxide is an aromatic monoepoxide or an epoxidized oil.

10. The curing agent of claim 1 wherein the monoepoxide is cresyl monoglycidyl ether or epoxidized cashew nut oil.

11. A low temperature curable coating composition comprising the curing agent of claims 1–7, 9 or 10 in admixture with a polyepoxide.

12. The composition of claim 11 wherein the polyepoxide is a polyglycidyl ether of a dihydric phenol.

13. The composition of claim 12 wherein the dihydric phenol is bisphenol-A.

14. The composition of claim 11 wherein the polyepoxide has a weight per epoxide of no greater than about 600.

15. The composition of claim 14 wherein the polyepoxide has a weight per epoxide of about 180 to 200.

16. The composition of claim 11 wherein the ratio of the epoxy groups on the polyepoxide to the reactive amine hydrogen groups in the curing agent is in the range of about 0.5 to 1.0 to about 1.5 to 1.0.

* * * * *